(12) United States Patent
Shibata

(10) Patent No.: US 10,684,803 B2
(45) Date of Patent: Jun. 16, 2020

(54) IMAGE FORMING APPARATUS FOR EXECUTING PRINT JOB

(71) Applicant: KYOCERA Document Solutions Inc., Osaka (JP)

(72) Inventor: Yukihiro Shibata, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/553,368

(22) Filed: Aug. 28, 2019

(65) Prior Publication Data

US 2020/0073599 A1 Mar. 5, 2020

(30) Foreign Application Priority Data

Aug. 31, 2018 (JP) .................................. 2018-163421

(51) Int. Cl.
*G03G 15/00* (2006.01)
*G06F 3/12* (2006.01)

(52) U.S. Cl.
CPC .......... *G06F 3/1205* (2013.01); *G06F 3/1254* (2013.01); *G06F 3/1273* (2013.01)

(58) Field of Classification Search
None
See application file for complete search history.

(56) References Cited

U.S. PATENT DOCUMENTS

| 2007/0058219 A1* | 3/2007 | Yamaguchi | H04N 1/00795 358/497 |
| 2015/0234333 A1* | 8/2015 | Yasuda | G03G 15/5016 399/75 |
| 2017/0155780 A1* | 6/2017 | Ishihara | G06F 3/1204 |

FOREIGN PATENT DOCUMENTS

| JP | 2007-057606 A | 3/2007 |
| JP | 2014-142498 A | 8/2014 |

* cited by examiner

*Primary Examiner* — Andrew H Lam
(74) *Attorney, Agent, or Firm* — IP Business Solutions, LLC

(57) ABSTRACT

An image forming apparatus includes: an image formation section, an instruction input section, a storage section, and a control section. Upon every execution of a print job in accordance with the print job execution instruction inputted to the instruction input section by a user, the control section causes the storage section to store as history information, in association with the user who has instructed the execution of the print job, which of a normal mode and a silent mode has been set. When the print job execution instruction has been inputted to the instruction input section without the input of a mode setting instruction from the user, the control section reads out the history information associated with the user from the storage section, sets either of the normal mode and the silent mode based on the read history information, and controls the image formation section to execute the print job.

6 Claims, 4 Drawing Sheets

Fig.4

| IDENTIFICATION INFORMATION ID OF USER | MODE/ ADDITION VALUE α | MODE/ ADDITION VALUE α | MODE/ ADDITION VALUE α | ... |
|---|---|---|---|---|
| aaa | NORMAL/2 | NORMAL/2 | NORMAL/1 | ... |
| bbb | SILENT/2 | SILENT/1 | SILENT/1 | ... |
| ccc | SILENT/1 | SILENT/1 | SILENT/1 | ... |
| ... | ... | ... | ... | ... |

RD

IMAGE FORMING APPARATUS FOR EXECUTING PRINT JOB

INCORPORATION BY REFERENCE

This application claims priority to Japanese Patent Application No. 2018-163421 filed on Aug. 31, 2018, the entire contents of which are incorporated by reference herein.

BACKGROUND

This disclosure relates to an image forming apparatus and more specifically to a technology of setting either of a normal mode and a silent mode, in which an operation speed is reduced more than in the normal mode to provide smaller operation sound than operation sound provided in the normal mode, to execute a print job.

BACKGROUND ART

Demands on business machines for silence have been increasing in recent years, which also applies to image forming apparatuses such as copiers, printers, and multi-function peripherals. Thus, for example, in a first technology, it is detected by a human body detection sensor whether or not any person is present around an image forming apparatus, and a standard mode in which a motor rotation speed of the apparatus is high is selected upon detecting any person while a silent mode in which the motor rotation speed of the apparatus is low is selected upon detecting no person.

In a second technology, a level of environmental noise is measured by a sound collector controller and activity levels such as a position, a body temperature, and an action speed of a person are determined by a human sensor controller. Then a CPU calculates a distance from a print system to the person based on a position of the print system and the position of the person determined by the human sensor controller. Upon print job execution in a standard mode, the CPU predicts a level of operating sound generated from the print system and selects an operation mode of the print system based on the level of the environmental nose, the activity levels, the distance, and the level of the operating sound.

SUMMARY

As one aspect of this disclosure, a technology obtained by further improving the aforementioned technology will be described.

An image forming apparatus according to one aspect of this disclosure includes an image formation section, an instruction input section, a storage section, and a control unit. The image formation section forms an image on recording paper. Into the instruction input section, a mode setting instruction indicating by which of a normal mode and a silent mode the image formation section performs image formation is inputted, the silent mode being a mode where operation sound is made smaller than operation sound in the normal mode by reducing an operation speed than the normal mode. The control unit includes a processor and functions as a control section as a result of execution of a control program by the processor. In accordance with a print job execution instruction and the mode setting instruction inputted to the instruction input section, the control section sets either of the normal mode and the silent mode, and controls the image formation section to execute a print job. Upon every execution of the print job in accordance with the print job execution instruction inputted to the instruction input section by a user, the control section causes the storage section to store as history information, in association with the user who has instructed the execution of the print job, which of the normal mode and the silent mode has been set. When the print job execution instruction has been inputted to the instruction input section without the input of the mode setting instruction from the user, the control section reads out the history information associated with the user from the storage section, sets either of the normal mode and the silent mode based on the read history information, and controls the image formation section to execute the print job.

BRIEF DESCRIPTION OF THE DRAWINGS

FIG. 4 is a diagram conceptually illustrating history information storing which of the normal mode and the silent mode has been set upon every execution of a print job.

DETAILED DESCRIPTION

Hereinafter, an embodiment of this disclosure will be described with reference to the drawings.

Figure 1:
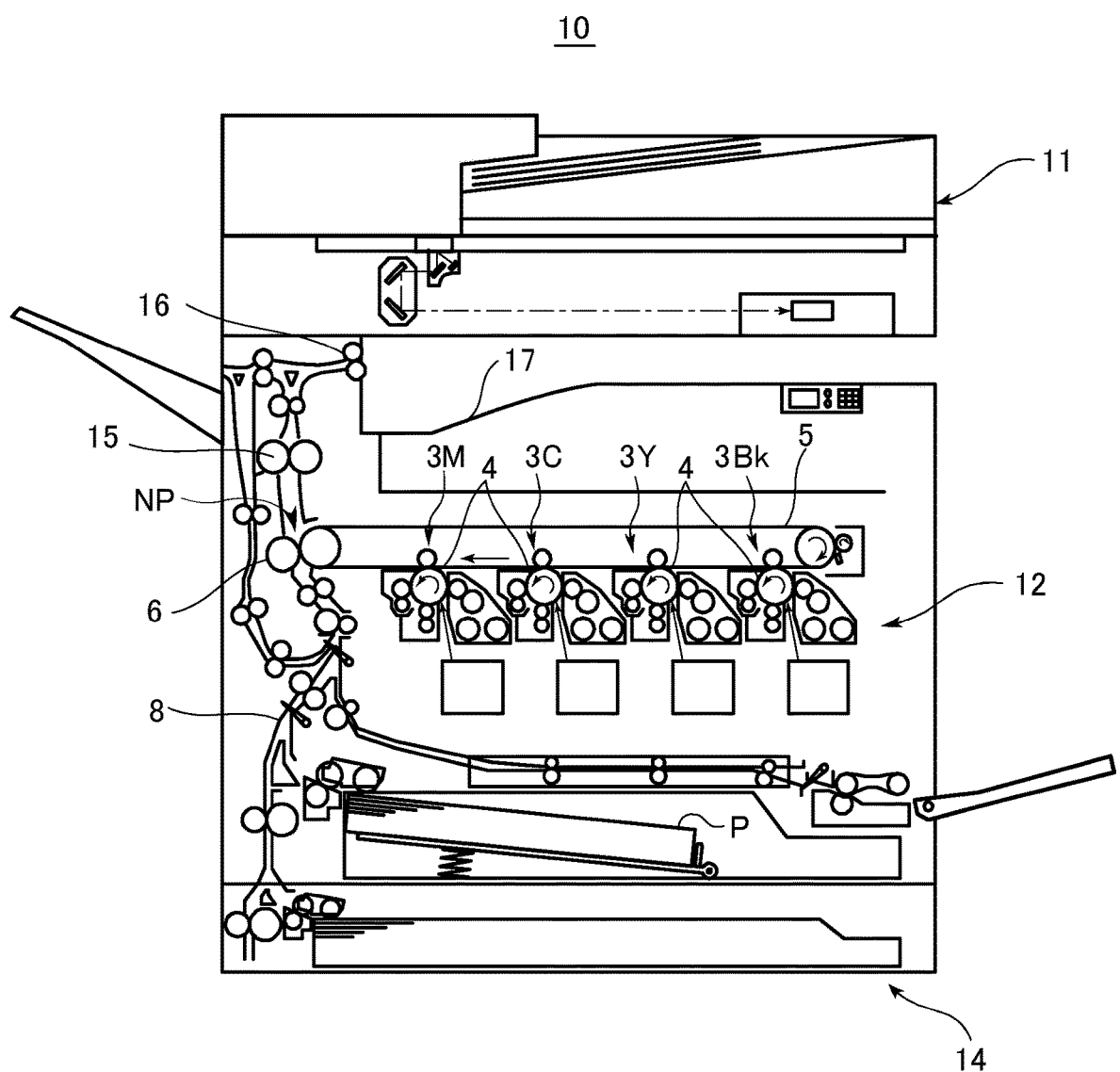
FIG. 1 is a sectional view illustrating an image forming apparatus according to one embodiment of this disclosure.

FIG. 1 is a sectional view illustrating an image forming apparatus of one embodiment according to this disclosure. An image forming apparatus 10 of this embodiment is, for example, a multifunction peripheral (MFP) provided with a plurality of functions such as a copy function, a printer function, and a scanner function. The image forming apparatus 10 includes an image reading section 11 and an image formation section 12.

The image reading section 11 has an image pickup element which optically reads an image of a document. An analog output of the image pickup element is converted into a digital signal to generate image data indicating the image of the document.

The image formation section 12 prints the aforementioned image data or an image indicated by image data received from an outside and includes: a magenta image formation unit 3M, a cyan image formation unit 3C, a yellow image formation unit 3Y, and a black image formation unit 3Bk. In any of the image formation units 3M, 3C, 3Y, and 3Bk, a surface of a photosensitive drum 4 is uniformly charged and exposed, forming an electrostatic latent image on the surface of the photosensitive drum 4, and the electrostatic latent image formed on the surface of the photosensitive drum 4 is developed into a toner image and the toner image formed on the surface of the photosensitive drum 4 is primarily transferred onto an intermediate transfer belt 5. Consequently, the color toner image is formed on the intermediate transfer belt 5. The color toner image is secondarily transferred onto recording paper P, which has been conveyed from a paper feed section 14 via a conveyance path 8, in a nip area NP between the intermediate transfer belt 5 and a secondary transfer roller 6.

Then the recording paper P is heated and pressurized by a fixing device 15, whereby the toner image formed on the recording paper P is fixed through thermal compression, and the recording paper P is further discharged onto a discharge tray 17 through a discharge roller 16.

Figure 2:
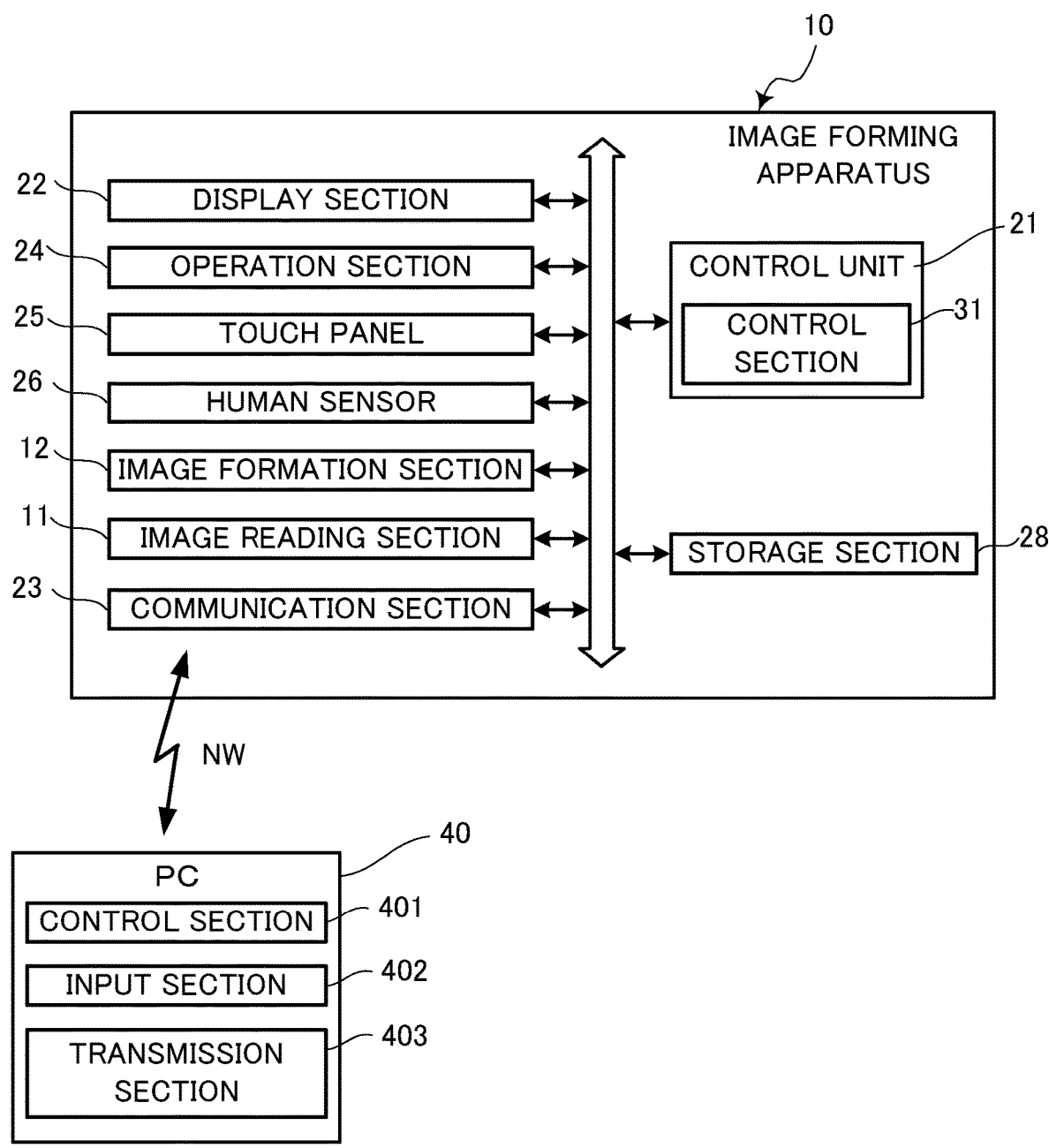
FIG. 2 is a block diagram illustrating main inner configuration of the image forming apparatus of this embodiment.

Next, configuration related to control of the image forming apparatus 10 will be described. FIG. 2 is a functional block diagram illustrating main inner configuration of the image forming apparatus 10. As illustrated in FIG. 2, the image forming apparatus 10 includes: a control unit 21, a display section 22, a communication section 23, an operation section 24, a touch panel 25, a human sensor 26, a storage section 28, the image reading section 11, the image formation section 12, etc. The aforementioned components are capable of data or signal transmission and reception to and from each other via a bus.

The display section 22 is formed of, for example, a liquid crystal display (LCD) or an organic light-emitting diode (OLED).

The communication section 23 is a communication interface including a communication module and performs data communication with a personal computer (PC) 40 via a network NW The operation section 24 includes hard keys such as ten keys, a Determine key, and a Start key.

The touch panel 25 is superposed on a screen of the display section 22. The touch panel 25 is a touch panel of a so-called resistive film type or electrostatic capacity type and detects touch of the touch panel 25 by, for example, a finger of a user together with a position of the aforementioned touch and inputs a user instruction for, for example, a GUI on the screen of the display section 22. Therefore, the touch panel 25 plays a role as an instruction input section to which user operation performed on the screen of the display section 22 is inputted. The operation section 24 also plays a role as an instruction input section.

The storage section 28 is composed of: a random access memory (RAM), a large-capacity hard disc drive (HDD), etc. and stores various pieces of data and programs.

The human sensor 26 is a known sensor which detects a person present around the image forming apparatus 10. For example, the human sensor 26 is an infrared sensor which detects infrared rays emitted from a human body.

The control unit 21 is composed of: a processor, a RAM, a read only memory (ROM), etc. The processor is, for example, a central processing unit (CPU), an MPU, or an ASIC. The control unit 21 functions as a control section 30 as a result of execution of a control program stored in the ROM or the storage section 28 by the processor. Note that the control section 31 of the control unit 21 may each be formed by a hard circuit without depending on operation performed based on the control program.

The control section 31 plays a role as a processing section which executes various types of processing. The control section 31 also controls the display section 22 to display various setting screens, information, etc. The control section 31 further controls communication operation of the communication section 23.

The PC 40 includes: a control section 401 including, for example, a CPU which is in charge of overall operation control of the PC 40; an input section 402 including, for example, a keyboard by which a print job execution instruction from the user and a mode setting instruction for instructing in which of a normal mode and a silent mode the print job is executed are inputted from the user; and a transmission section 403 composed of, for example, a communication interface which transmits, to the image forming apparatus 10 through, for example, the network, the print job execution instruction and the mode setting instruction inputted to the input section 402. Upon input of the print job execution instruction and the mode setting instruction to the input section 402 by the user of the PC 40, the transmission section 403 transmits the print job execution instruction together with the mode setting instruction to the image forming apparatus 10.

In the image forming apparatus 10, upon receiving the print job execution instruction and the mode setting instruction at the communication section 23 from the PC 40, the control section 31 executes the print job in the normal mode or the silent mode indicated by the mode setting instruction and the image formation section 12 records an image on recording paper. Therefore, the communication section 23 also plays a role as the instruction input section.

Here, the normal mode is a mode in which a mechanism of, for example, the image formation section 12 is operated at a predefined normal operation speed to perform image formation operation under control performed by the control section 31. The silent mode is a mode where operation sound is made smaller than operation sound in the normal mode by reducing the operation speed of the mechanism such as the image formation section 12 than the normal mode. That is, a speed of processing for forming the image on the recording paper is relatively fast and the operation sound generated from the image forming apparatus 10 is relatively large in the normal mode. In the silent mode, the processing speed is slower than in the silent mode and the operation sound is smaller than in the normal mode.

Upon each print job execution, the control section 31 causes the storage section 28 to store as history information, in association with each user who has instructed the print job execution, which of the normal mode and the silent mode has been set.

Then when the print job execution instruction has been inputted to the instruction input section without the input of the mode setting instruction to the instruction input section by the user, the control section 31 reads out, from the storage section 28, the history information associated with the user and sets the normal mode or the silent mode based on the read history information to execute the print job.

Figure 3:
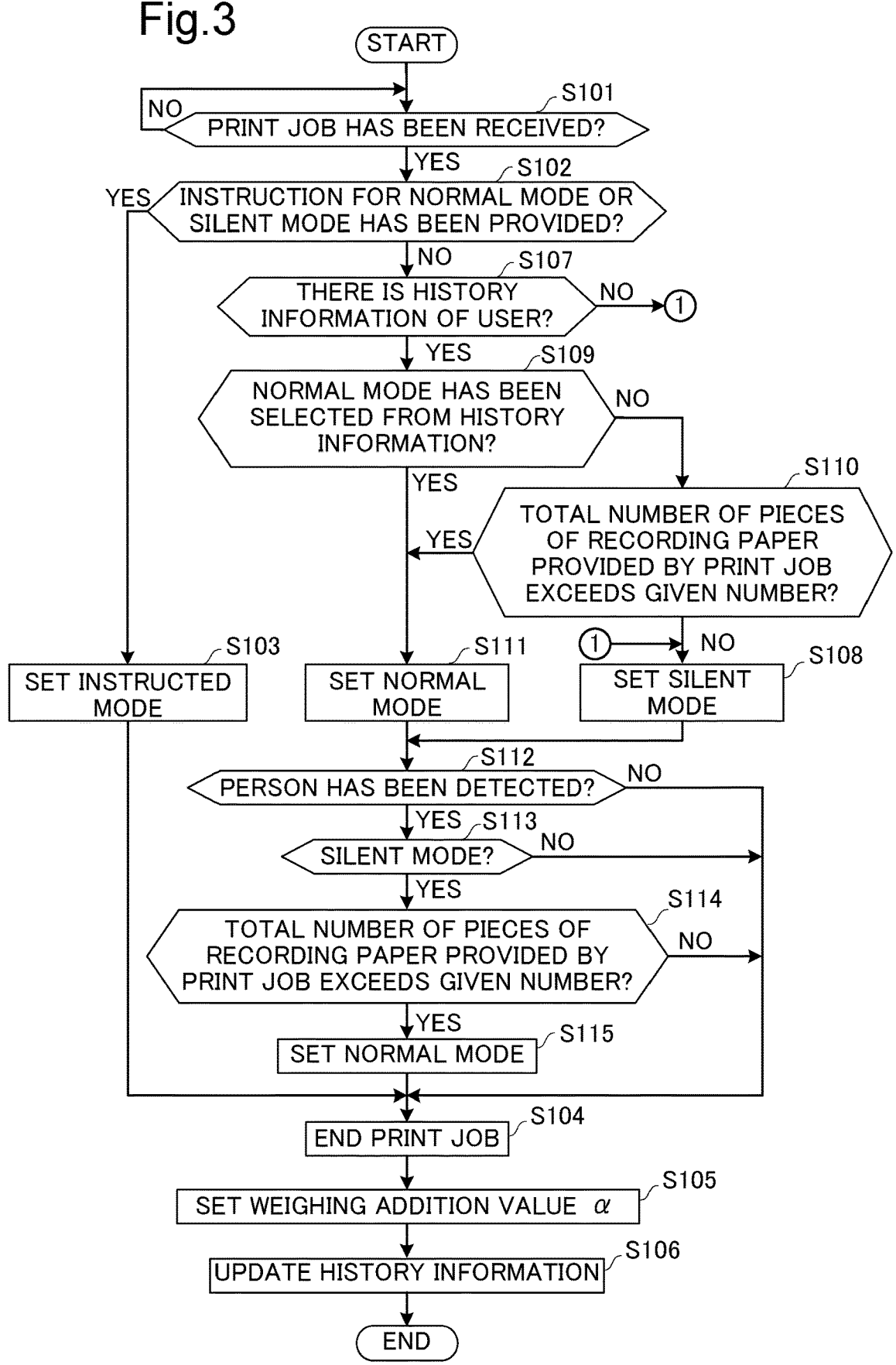
FIG. 3 is a flowchart illustrating procedures of processing for setting either of a normal mode and a silent mode upon execution of a print job.

Next, procedures of processing for setting either of the normal mode and the silent mode upon the print job execution will be described with reference to, for example, a flowchart illustrated in FIG. 3.

The control section 31 waits for input of the print job execution instruction ("No" in S101). The print job execution instruction is inputted by, for example, operating the input section 402 of the PC 40 by the user and is transmitted together with identification information ID of the user to the image forming apparatus 10 through the network NW by the transmission section 403.

In the image forming apparatus 10, upon receiving the print job execution instruction and the identification information ID of the user at the communication section 23 ("Yes" in S101), the control section 31 proceeds to processing for executing the print job in S102 beyond in a case where the identification information ID has been approved.

Moreover, the user of the PC 40 operates the input section 402 of the PC 40 to input the mode setting instruction for specifying the normal mode or the silent mode, and the transmission section 403 transmits the mode setting instruction together with the print job execution instruction and the own identification information ID from the PC 40 to the image forming apparatus 10. In the image forming apparatus 10, upon receiving the mode setting instruction at the communication section 23, the control section 31 determines that the normal mode or the silent mode has been instructed ("Yes" in S102), sets the instructed normal mode or silent mode to execute the print job in accordance with the aforementioned execution instruction, causing the image formation section 12 to record an image onto recording paper (S103).

Then upon ending of the print job (S104), due to a fact that the normal mode or silent mode set in S103 upon the print job execution is instructed by the user through the mode setting instruction, the control section 31 sets a weighing addition value α of the normal mode or the silent mode at "2" as a predefined value A (a first value) (S105), causing the storage section 28 to store, as history information RD of the user, which of the normal mode and the silent mode has been set (S106).

Moreover, in a case where there is no corresponding history information RD since the history information RD corresponding to the identification information ID of the user received in S101 is not stored in the storage section 28, the control section 31 sets the weighing addition value α of the normal mode or the silent mode at "2" as the predefined value A (S105) and then generates new history information RD for the user, causing the storage section 28 to store this history information RD corresponding to the identification information ID of the user (S106).

In a case where the instructions for the print job execution and for the normal mode or the silent mode have been transmitted from the PC 40 to the image forming apparatus 10, the instructed normal mode or silent mode is set and the print job is executed. Then the control section 31 ends the processing of FIG. 3 once, waits for a print job execution instruction, and starts the processing from S101 in a case where the print job execution instruction has been provided.

FIG. 4 is a diagram illustrating the history information RD. The history information RD stores: for each identification information ID of a plurality of users, which of the normal mode and the silent mode has been set upon execution of, for example, 10 print jobs immediately after a point at which a latest print job was executed; and respective weighing addition values α. Upon executing a new print job, the control section 31 erases, from the history information RD corresponding to the identification information ID of the user who has instructed the execution of the new print job, the normal mode or the silent mode and the weighing addition value α which were set upon executing the oldest print job, causing the storage section 28 to store the normal mode or the silent mode and the weighing addition value α which were set upon executing the new print job.

Moreover, when the normal mode or the silent mode has been set as a result of instructing the normal mode or the silent mode from the PC 40 to the image forming apparatus 10 by the user through the mode setting instruction, the control section 31 sets the weighing addition value α at the predefined value A (for example, "2", and hereinafter referred to as "2" in this embodiment). Moreover, as described below, in a case where the normal mode or the silent mode is to be set based on the history information RD without depending on the mode setting instruction, the control section 31 sets the weight addition value α at a predefined value B (a second value). Here, it is assumed that the predefined value B<the predefined value A, and the predefined value B is, for example, "1" and hereinafter referred to as "1" in this embodiment.

On the other hand, through operation of the input section 402, the user of the PC 40 can cause the transmission section 403 to transmit, to the image forming apparatus 10, only the print job execution instruction and the own identification information ID without instructing the normal mode or silent mode through the mode setting instruction. In this case, in the image forming apparatus 10, while receiving the print job execution instruction and the identification information ID of the user at the communication section 23 ("Yes" in S101), the mode setting instruction is not received, and the control section 31 determines that the normal mode or the silent mode has not been instructed ("No" in S102).

Then the control section 31 determines whether or not the storage section 28 stores the history information RD corresponding to the identification information RD of the user (S107), in a case where the storage section 28 does not store the history information RD of the user ("No" in S107), the control section 31 sets the silent mode (S108) to start the print job, causing the image formation section 12 to record the image on the recording paper.

In a case where the storage section 28 stores the history information RD corresponding to the identification information ID of the user ("Yes" in S107), the control section 31 selects either of the normal mode and the silent mode based on the history information RD. For example, the control section 31 calculates a total value of the weighing addition values α for each of the normal mode and the silent mode in the history information RD. The control section 31 compares the total value of the weighing addition values α in the normal mode and the total value of the weighing addition values α in the silent mode to select either the normal mode or the silent mode whichever has the larger total value of the weighing addition values α (note that the predefined mode is selected in a case where the both total values are equal).

Here, in a case where the normal mode has been selected ("Yes" in S109), the control section 31 sets the normal mode to start the print job, causing the image formation section 12 to form the image on the recording paper (S111).

In a case where the silent mode has been selected ("No" in S109), the control section 31 further calculates a number N1 of pieces of recording paper on which images will be formed through the execution of the current print job and a number N2 of pieces of recording paper on which images will be formed through execution of any other print job which is waiting for execution at this point, and calculates a total number of pieces N (=N1+N2) of recording paper on which the images will be formed by the image formation section 12 in accordance with all the print jobs, including the current print job, inputted to the instruction input instruction at this point. Then the control section 31 determines whether or not the calculated total number N exceeds a preset given number Nth (for example, 100) (S110).

Upon determining that the total number N of pieces of recording paper does not exceed the given number Nth ("No" in S110), the control section 31 sets the silent mode to start the print job, causing the image formation section 12 to form the image on the recording paper (S108). That is, in a case where the total number N of pieces of recording paper on which the images will be formed through the execution of the print job is relatively small, time required for executing all the print jobs is relatively short, so that the silent mode is left to be set even when image formation time is long.

Upon determining that the total number N of pieces of recording paper exceeds the given number Nth ("Yes" in S110), the control section 31 changes the silent mode selected in S109 to the normal mode and sets the normal mode to start the print job, causing the image formation section 12 to record the image on the recording paper (S111). That is, in a case where the total number N of pieces of recording paper on which the images will be formed through the execution of all the print jobs is relatively large, time required for executing the print jobs is long in the silent mode, so that the normal mode with a fast image formation speed is set.

Therefore, in a case where no mode setting instruction has been transmitted from the PC 40 to the image forming apparatus 10, the normal mode is set to start the print job even when the history information RD corresponding to the identification information ID of the user is present, the normal mode has been selected based on the history information RD, and the total number N of pieces of recording paper on which the images will be formed through the execution of the print jobs exceeds the given number Nth, while the silent mode is set to start the print job, reducing the operation sound of the image forming apparatus 10 to be small in other cases.

Further, after the silent mode has been set to start the print job in S108 or after the normal mode has been set to start the print job in S111, the control section 31 waits for detection of a person by the human sensor 26 (S112).

At this point, upon ending of the print job (S104) without detection of the person by the human sensor 26 ("No" in S112), the control section 31 reads out, from the storage section 28, the history information RD corresponding to the identification information ID of the user received in S101, sets the weighing addition value α of the normal mode or the silent mode at "1" as a predefined value B (S105) due to a fact that the normal mode set in S111 or the silent mode set in S108 has not been instructed by the user, and records the normal mode or the silent mode and its weighing addition value α for the read history information RD to update the history information RD (S106).

On the other hand, upon detection of the person by the human sensor 26 ("Yes" in S112), the control section 31 determines whether or not the print job has been executed in the silent mode (S113), and in a case where the print job has not been executed in the silent mode ("No" in S113), that is, in a case where the print job has been executed in the normal mode set in S111, the control section 31 maintains the normal mode to continue the image formation operation. Then upon ending of the print job (S104), the control section 31 reads out, from the storage section 28, the history information RD corresponding to the identification information ID of the user which has been received in S101, sets the weighing addition value α of the normal mode at "1" as the predefined value B (S105) due to a fact that the normal mode set in S111 has not been instructed by the user, and records the normal mode and its weighing addition value α for the read history information RD to update the history information RD (S106).

In a case where the print job has been executed in the silent mode set in S108 ("Yes" in S113), the control section 31 determines whether or not the total number N including the number N1 of pieces of recording paper on which the images will be formed through the execution of the current print job and the number N2 of pieces of recording paper on which the images will be formed through the execution of any other print job waiting for execution at this point exceeds the given number Nth (S114).

Upon determining that the total number N of pieces of recording paper does not exceed the given number Nth ("No" in S114), the control section 31 maintains the silent mode and ends the print job (S104), reads out, from the storage section 28, the history information RD corresponding to the identification information ID of the user which has been received in S101, sets the weighing addition value α of the silent mode set in S108 at a small value "1" (S105) due to a fact that the silent mode set in S108 has not been instructed by the user, and records the silent mode and its weighing addition value α for the read history information RD to update the history information RD (S106).

Upon determining that the total number N of pieces of recording paper exceeds the given number Nth ("Yes" in S114), the control section 31 switches the silent mode to the normal mode and continues the print job (S115). Upon ending of the print job (S104), the control section 31 reads out, from the storage section 28, the history information RD corresponding to the identification information ID of the user which has been received in S101, sets the weighing addition value α of the normal mode at the small value "1" (105) due to a fact that the normal mode has not been instructed by the user, and records the normal mode and its weighing addition value α for the read history information RD to update the history information RD (S106).

Specifically, in a case where the total number N of pieces of recording paper does not exceed the given number Nth at a processing point in S110 but the total number N of pieces of recording paper has reached the given number Nth at a processing point in S114, the control section 31 changes the silent mode to the normal mode to execute the print job, while the control section 31 maintains the silent mode to execute the print job in other cases. Moreover, in a case where the normal mode has been set in S111, the control section 31 maintains the normal mode to execute the print job regardless of whether or not the person has been detected by the human sensor 26.

In this embodiment as described above, the normal mode or the silent mode is stored as the history information upon the execution of the print job, and if the normal mode or the silent mode has not been instructed by the user upon execution of a new print job, either the normal mode or the silent mode is selected and set based on: for example, the history information; the total number N of pieces of recording paper on which the images will be formed through the execution of the print job; and whether or not the person has been detected by the human sensor 26. Thus, it is possible to adjust the operation sound of the image forming apparatus 10 by selecting the normal mode or the silent mode while reflecting user's preference of the normal mode or the silent mode based on the history information.

Here, in the first and second technologies described in BACKGROUND ART above, the operation sound of the image forming apparatus (or the print system) is adjusted based on the detection of the person or the activity levels of the person and the distance from the person.

However, the operation sound of the image forming apparatus is not adjusted while reflecting preference of an individual user. That is, some users demand for reducing the operation sound of the image forming apparatus while accepting a reduction in the processing speed of the image forming apparatus and some users demand for increasing the processing speed while accepting an increase in the operation sound, but these demands cannot be met in the first and second technologies.

On the contrary, this embodiment makes it possible to adjust the operation sound of the image forming apparatus while reflecting the preference of the individual user.

In this embodiment, after the silent mode has been set to start the print job in S108 or after the normal mode has been set to start the print job in S111, it is determined in S114 that the total number N of pieces of recording paper on which the images will be recorded through the execution of the print job exceeds the given number Nth, but S114 may be omitted. Moreover, the given number Nth is a desired number which can be changed or adjusted. That is, in a case where the silent mode has been set in S108, upon detection of the person by the human sensor 26 ("Yes" in S112), the control section 31 switches the silent mode to the normal mode and continues the print job (S115). The reason is that when a person approaches to the image forming apparatus 10, the person likely operates the image forming apparatus 10 to start further image formation operation and thus accumulated print jobs should be quickly completed.

When an instruction for switching to the normal mode through operation of the operation section 24 by the user has been instructed after the silent mode has been set to start the print job in S108, the control section 31 may switch the silent mode to the normal mode. In this case, since the normal mode is instructed by the user, the control section 31 sets the weighing addition value α of the normal mode at the large value "2" to update the history information RD.

The control section 31 may record only a number of times of setting the normal mode and a number of times of setting the silent mode into the history information without setting the weighing addition values α of the normal mode and the silent mode and may select the normal mode or the silent mode whichever has the larger number of times of most recent setting.

The instructions for the print job execution and for the normal mode or the silent mode as well as the identification information ID of the user are transmitted from the PC 40 to the image forming apparatus 10, but the user may operate the operation section 24 of the image forming apparatus 10 to input the instructions for the print job execution and for the normal mode or the silent mode as well as the identification information ID of the user and the control section 31 may receive contents of the aforementioned inputting.

Instead of the input of the identification information ID of the user, the identification information ID of the user ma be read and inputted from an ID card of the user thorough a card reader. Alternatively, for example, face authentication, fingerprint authentication, or voice authentication may be used to identify the user to obtain the identification information ID corresponding to the user.

The configuration and the processing of the embodiment described above with reference to FIGS. 1 to 4 form just one example of this disclosure, and this disclosure is not limited to the configuration and the processing in any manner.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
an image formation section forming an image on recording paper;
an instruction input section into which a mode setting instruction indicating by which of a normal mode and a silent mode the image formation section performs image formation is inputted, the silent mode being a mode where operation sound is made smaller than operation sound in the normal mode by reducing an operation speed than the normal mode;
a storage section; and
a control unit including a processor and functioning as a control section as a result of execution of a control program by the processor, wherein
in accordance with a print job execution instruction and the mode setting instruction inputted to the instruction input section, the control section sets either of the normal mode and the silent mode, and controls the image formation section to execute a print job,
upon every execution of the print job in accordance with the print job execution instruction inputted to the instruction input section by a user, the control section causes the storage section to store as history information, in association with the user who has instructed the execution of the print job, which of the normal mode and the silent mode has been set, and,
when the print job execution instruction has been inputted to the instruction input section without the input of the mode setting instruction from the user, the control section reads out the history information associated with the user from the storage section, sets either of the normal mode and the silent mode based on the read history information, and controls the image formation section to execute the print job.

2. The image forming apparatus according to claim 1, wherein
based on a number of times of setting made in past indicated by the history information, the control section sets either of the normal mode and the silent mode, whichever has the larger number of times of setting.

3. The image forming apparatus according to claim 1, wherein
the control section
in a case where either of the normal mode and the silent mode has been set in accordance with the mode setting instruction inputted to the instruction input section to execute the print job, sets weighing of either of the normal mode and the silent mode at a predefined first value, and
in a case where either of the normal mode and the silent mode has been set not in accordance with the mode setting instruction inputted to the instruction input section to execute the print job, sets the weighing of either of the normal mode and the silent mode at a predefined second value being smaller than the first value,
causes the storage section to store, as the history information, together with the weighing, which of the normal mode and the silent mode has been set, and
in a case where the print job execution instruction has been inputted to the instruction input section without the input of the mode setting instruction from the user, the control section reads out the history information associated with the user from the storage section, sums up values indicated by the weighing indicated by the history information, and sets either of the normal mode and the silent mode, whichever has a larger total value of the weighing.

4. The image forming apparatus according to claim 1, wherein
in a case where a new print job execution instruction has been inputted to the instruction input section without the input of the mode setting instruction, the control section determines whether or not a number of pieces of recording paper on which images are to be formed by the image formation section in accordance with all print jobs, including the new print job, inputted to the instruction input section at this time exceeds a preset given number, and
in a case where the number of pieces of recording paper exceeds the given number, regardless of the setting of either of the normal mode and the silent mode based on the history information, the control section sets the normal mode to execute all the print jobs.

5. The image forming apparatus according to claim 1, further comprising
- a human sensor detecting a person present within a predefined range from the image forming apparatus, wherein
- in a case where a new print job execution instruction has been inputted to the instruction input section without the input of the mode setting instruction, the control section determines whether or not a number of pieces of recording paper on which images are to be formed by the image formation section in accordance with all print jobs, including the new print job, inputted to the instruction input section at this time exceeds a preset given number, and
- in a case where the number of pieces of recording paper exceeds the given number and, regardless of the setting of either of the normal mode and the silent mode based on the history information, regardless of the setting of either of the normal mode and the silent mode based on the history information, the control section sets the normal mode to execute all the print jobs.

6. The image forming apparatus according to claim 1, wherein
- in a case where an instruction of switching to the normal mode is inputted to the instruction input section through operation performed by the user after the silent mode has been set to start the print job, the control section switches the silent mode to the normal mode.

* * * * *